United States Patent
Haley

(10) Patent No.: US 7,366,913 B1
(45) Date of Patent: Apr. 29, 2008

(54) KNOWLEDGE-TYPE AUTHORIZATION DEVICE AND METHODS

(76) Inventor: Jeffrey T. Haley, 4730 - 91st Ave. SE., Mercer Island, WA (US) 98040-4440

( * ) Notice: Subject to any disclaimer, the term of this patent is extended or adjusted under 35 U.S.C. 154(b) by 814 days.

(21) Appl. No.: 10/236,291

(22) Filed: Sep. 4, 2002

(51) Int. Cl.
G06F 11/03 (2006.01)
H04K 1/00 (2006.01)
G06K 5/00 (2006.01)
H04L 1/00 (2006.01)

(52) U.S. Cl. ............ 713/189; 713/182; 380/247; 235/380; 705/64

(58) Field of Classification Search ........... 713/189, 713/182; 705/64; 380/247; 235/380
See application file for complete search history.

(56) References Cited

U.S. PATENT DOCUMENTS

| | | | |
|---|---|---|---|
| 5,220,501 A | 6/1993 | Lawlor et al. | |
| 5,584,043 A | 12/1996 | Burkart | |
| 5,604,787 A * | 2/1997 | Kotzin et al. | 455/558 |
| 5,629,981 A * | 5/1997 | Nerlikar | 713/168 |
| 5,664,110 A * | 9/1997 | Green et al. | 705/26 |
| 5,761,647 A * | 6/1998 | Boushy | 705/10 |
| 5,815,577 A | 9/1998 | Clark | |
| 6,098,878 A * | 8/2000 | Dent et al. | 235/380 |
| 6,142,369 A * | 11/2000 | Jonstromer | 235/380 |
| 6,151,677 A * | 11/2000 | Walter et al. | 713/183 |
| 6,182,892 B1 * | 2/2001 | Angelo et al. | 235/380 |
| 6,442,532 B1 * | 8/2002 | Kawan | 705/36 R |
| 6,487,180 B1 * | 11/2002 | Borgstahl et al. | 370/310 |
| 6,513,719 B1 * | 2/2003 | Imura | 235/492 |
| 6,621,425 B2 * | 9/2003 | Maeda | 341/50 |
| 6,707,915 B1 * | 3/2004 | Jobst et al. | 380/247 |
| 6,732,278 B2 * | 5/2004 | Baird et al. | 726/7 |
| 6,778,834 B2 * | 8/2004 | Laitinen et al. | 455/450 |
| 6,847,816 B1 * | 1/2005 | Sarradin | 455/407 |
| 6,868,391 B1 * | 3/2005 | Hultgren | 705/26 |
| 6,885,877 B1 * | 4/2005 | Ozaki et al. | 455/556.1 |
| 6,925,560 B1 * | 8/2005 | Basquin | 713/169 |
| 6,970,183 B1 * | 11/2005 | Monroe | 348/143 |
| 6,990,683 B2 * | 1/2006 | Itabashi | 726/9 |
| 7,010,601 B2 * | 3/2006 | Yoshimine et al. | 709/226 |
| 7,012,503 B2 * | 3/2006 | Nielsen | 340/5.6 |
| 7,031,665 B1 * | 4/2006 | Trell | 455/70 |

(Continued)

OTHER PUBLICATIONS

Overview of the PC Pay Module, Innovonics, May 13, 1998, 13 pages.

Primary Examiner—Emmanuel L. Moise
Assistant Examiner—Techane J. Gergiso
(74) Attorney, Agent, or Firm—Graybeal Jackson Haley LLP

(57) ABSTRACT

A wireless electronic authentication device with an authenticating smart chip, a local radio communication circuit, an input circuit that receives user input, and a power supply, all housed in a portable housing. Preferably, the authentication device is a mobile telephone with an authenticating smart chip. The user enters a knowledge token, such as a password stated by voice or a personal identification number input at the keyboard, to indicate that he is both in possession of the authorization device and knows the critical information. The knowledge token may be entered in advance and merely confirmed by the user pressing a key on the keypad when a confirmation is requested. A method is provided for making use of the authentication device to perform authorizations. A similar method is disclosed for use in existing systems and then achieving a gradual transition from existing systems to the new authentication device.

30 Claims, 2 Drawing Sheets

U.S. PATENT DOCUMENTS

| | | | |
|---|---|---|---|
| 7,031,945 B1 * | 4/2006 | Donner | 705/64 |
| 7,088,990 B1 * | 8/2006 | Isomursu et al. | 455/412.1 |
| 7,107,247 B2 * | 9/2006 | Kinoshita et al. | 705/64 |
| 7,134,024 B1 * | 11/2006 | Binding et al. | 713/187 |
| 7,136,631 B1 * | 11/2006 | Jiang et al. | 455/414.1 |
| 7,139,822 B2 * | 11/2006 | Guenther et al. | 709/224 |
| 7,170,878 B2 * | 1/2007 | Fukuda | 370/338 |
| 7,200,566 B1 * | 4/2007 | Moore et al. | 705/26 |
| 2002/0043557 A1 * | 4/2002 | Mizoguchi et al. | 235/375 |
| 2002/0143634 A1 * | 10/2002 | Kumar et al. | 705/18 |
| 2002/0147920 A1 * | 10/2002 | Mauro | 713/200 |
| 2003/0046554 A1 * | 3/2003 | Leydier et al. | 713/186 |
| 2003/0191721 A1 * | 10/2003 | Fiammante | 705/65 |

* cited by examiner

KNOWLEDGE-TYPE AUTHORIZATION DEVICE AND METHODS

BACKGROUND

The problems of remote contracting and security authorization (e.g. bank payment and entry to a door or computer network) can be classified into four groups: identification of a person taking an action ("identification"), proof of intent to take the action ("intent"), proof that neither of these was falsely simulated or altered ("integrity"), and assurance that any promised finds will be paid ("assurance"). To explain aspects of these problems, we begin by explaining these issues with respect to remote contracting with credit cards, debit cards, and checks.

When a credit card, debit card, or check is used for contracting in place of money, a remote third party (or group of parties), for simplicity called a "bank", becomes involved. The buyer is instructing the remote bank to pay the merchant. The bank and merchant are concerned with all four problems identified above.

Checks provide no assurance that the funds will be paid, other than the buyer's promise, and offer no means of identification. Consequently, they are seldom accepted by merchants without additional reliable information. Credit cards and debit cards (authorization cards) allow banks to assure merchants that the funds will be paid, provided the merchant electronically queries the bank's computer before accepting the contract. Integrity of this query is maintained because a private electronic link to the bank's computer is used. Proof of intent is indicated by the act of signing, for a typical credit card, or entering a personal identification number ("PIN"), for a typical debit card. Identification is achieved by the facts that the person possesses the card and either can quickly generate a signature matching that on the back of the card or knows the proper PIN to go with the card (something you have plus something you know). Assuming the PIN is verified across a secure communications link, a PIN provides better identification than a signature because the signature could be false on the back of the card or the person signing might have learned to forge the signature. It is easy for a person to create a counterfeit copy of a credit or debit card but it is impossible to derive the PIN from the card.

Security authorization situations include the same problems as remote contracting except for payment assurance. Solutions include biometric detection, requiring that a PIN be entered on a keypad, and the use of contact-type or contact-less identity cards (something you have).

Until biometric systems are perfected that can unmistakably detect and distinguish each human, each person will have to carry one or more authorization devices. For high security, such authorization devices will require something you have (the device) plus something you know ("knowledge-type authentication devices"). Input of something you know (a "knowledge token") can be by PIN on a keyboard or by voice into a voice recognition circuit or other input method.

DESCRIPTION OF THE INVENTION

Universal, Wireless, Knowledge-Type Authorization Device

Figure 1:
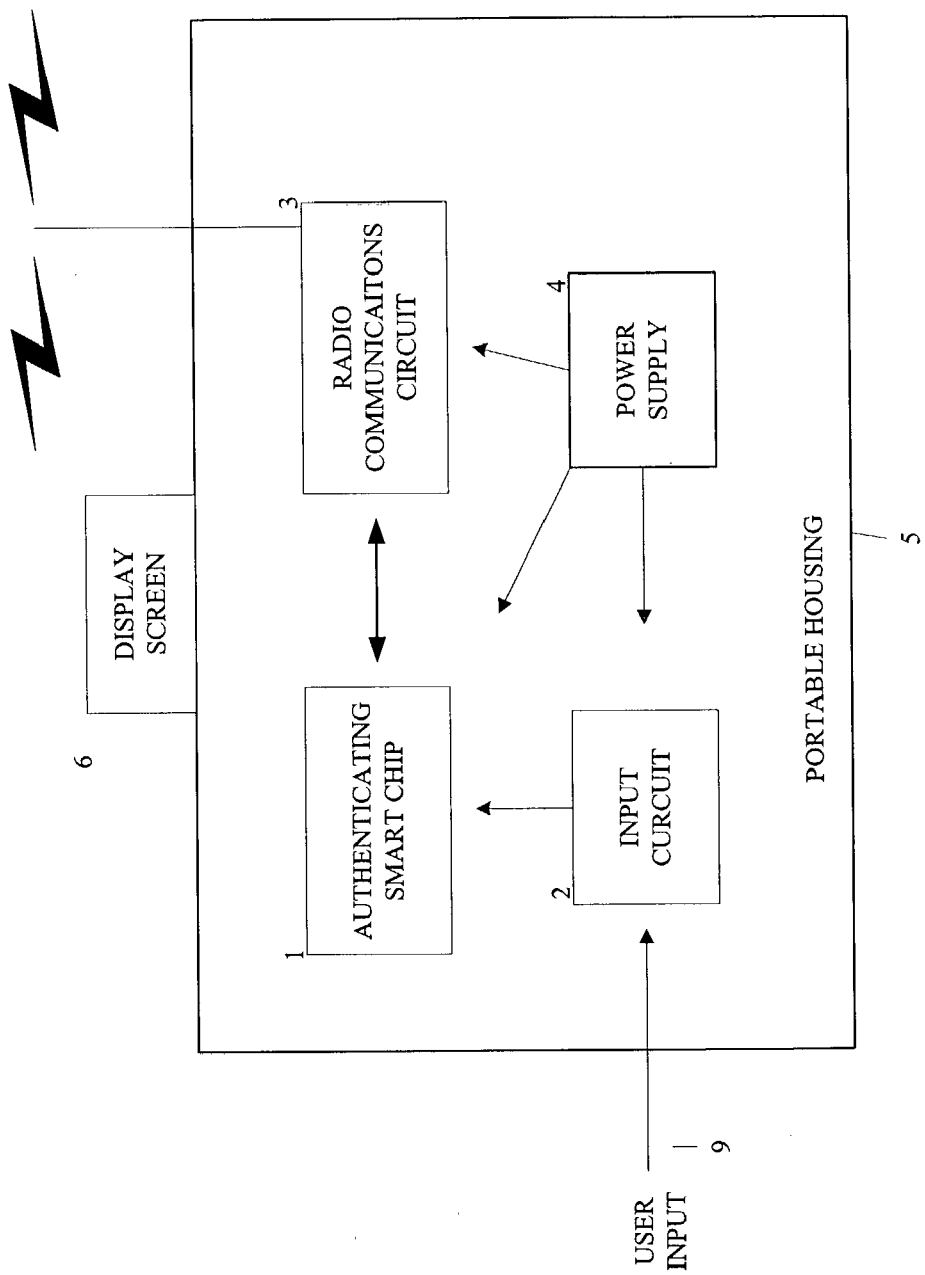
FIG. 1 shows the wireless authorization device, which is preferably a mobile telephone.

An improvement to a PIN type authorization device for contracting or security transactions provides a way to avoid the need for the buyer's device to be in contact with a reader and a way to avoid the need for the person to enter the knowledge token at the reader. Avoiding the need to contact the reader and entering a knowledge token at the reader allows quicker transactions such as when entering a secure area or a transit system or a place of entertainment. The present invention achieves this improvement by allowing people to enter a knowledge token on a device they have without approaching a contact-type reader. Essentially, a voice detection circuit or keyboard for PIN entry or other indication of intent is placed on this embodiment of the invented authorization device and the authorization device communicates by electro-magnetic radiation (radio) with a system maintained by the proprietor or bank. By use of a voice detection circuit rather than a keyboard, the device may have no moving parts. The device need be no larger than a chip card with embedded battery. So that the user understands the proposed transaction, the authorization device preferably includes a screen to display information about the proposed transaction.

A first embodiment of the invented methods using this authorization device might be called "wireless identification and proof of intent with knowledge token". Integrity and identification are assured by using a hack-proof smart chip in the device that is very difficult or impossible to duplicate and that uniquely identifies the device through bi-directional encrypted communication with a system maintained by the proprietor or bank. The system is coupled to a computer that looks up the unique identification for assurance of authorization. Use of encryption allows the communications to be carried across an insecure network without risk of loss of integrity. The user indicates their intent to agree to the transaction by entry at a keyboard or by voice input to the device or by passing a location while carrying the device.

For example, to pay for entry to an entertainment facility, the buyer holds their device as they approach the entrance. The screen displays information received by radio from the proprietor about the offered entertainment. The buyer enters the PIN or a voice sound to prove that he or she is the owner of the device and takes an action (which could be, for examples, the voice sound, entry of the PIN, pressing another key after entry of the PIN, or passing through a gate) to indicate intent to agree to the transaction, which intent is transmitted to the central system which then charges the buyer's account and may take a further action such as allowing the buyer (the buyer's authorization device) to pass through a gate.

As a further example, the authorization device can be used as a key to unlock any device or system that is designed to communicate by electromagnetic radiation (preferably radio) with the device, including a secure area or house or automobile or computer system. In this sense, the device is a "universal" knowledge-type authorization device.

As described above and shown in FIG. 1, essential features of the authorization device comprise an authenticating smart chip 1, means for entry of input 2, a radio communications link 3, and a power supply 4, all housed in a package 5 that is convenient for the person to carry in a secure fashion at all times when proof of authorization might be needed. Preferably, the device also includes a display screen 6. However, it is a bother and an expense for people to carry such devices. To achieve widespread use of the device, people must have a further motivation to carry it, and the expense must be very low. Without such a further motivation and cost control, people will simply carry cash or tokens or a credit card or a debit card or a contact type identity card or a contact-less (proximity) type identity card such as a card that authorizes a charge whenever a location is passed (such as used for automobile toll booths and other transit systems).

These critical problems of motivation and cost control are solved by combining the authorization device with a wireless telephone such as a cellular telephone. Increasingly, each cell phone has a one-to-one association with the person that carries it, thereby becoming an identifier of the person. Cell phones are becoming smaller and smaller. Soon, nearly everyone will carry a mobile telephone at all times when they might encounter a desire to prove an authorization, and people will provide to others only a mobile telephone number and no wired telephone number. People carry their cell phones in a manner that includes adequate attention to security for such an authorization device because a lost cell phone can cause considerable expense and inconvenience to its owner.

Mobile telephones include all of the necessary components for the invented authorization device other than a smart chip, which can be easily added to telephone circuitry. Mobile telephones each must have a unique identification chip to store a mobile telephone ID. The required smart chip can also store the mobile telephone ID, providing security against a thief programming a telephone to simulate another person's mobile telephone ID. By upgrading the mobile telephone's ID chip to a hack-proof smart chip and employing the invented methods, each person's mobile telephone becomes a universal, wireless, knowledge-type authorization device for use with any compatible system that requires authorization, including payment systems.

In the payment context, the mobile phone with smart chip replaces credit cards, debit cards, and proximity cards. The merchant enters charge information into a computer with a communications link to a central system; some of the charge information appears on the person's mobile telephone screen; and the person either enters a knowledge token or, having previously entered the knowledge token, presses another key to communicate an intention to accept the charge. The central system sends an assurance of payment to the merchant who then proceeds with the contract. The smart chip 1 provides security because the PIN or other knowledge token is entered only into the smart chip and never sent to a PC or on a network, and the smart chip can encrypt any information to be sent on a network such as a bank account number.

Optionally, a memory in the mobile phone, which might be in the smart chip 1, can keep a record of charges and thereby maintain a total of charges or a balance for presentation on the screen at any time.

Communications from the merchant's terminal to the mobile phone can pass by any of numerous methods. Preferably, it passes directly between them by short distance radio communications such as Bluetooth or 802.11. This avoids consuming resources of wide area networks such as cellular telephone networks or WAP or mobile internet radio networks; but these and others like them can also be used, the communications being passed through a central system.

Until most mobile phones include short distance radio capabilities, a centralized system would be employed. With the centralized system, the user can dial the centralized system from his or her mobile phone and the system can then match information provided with the call to information from the merchant, such as the mobile phone number, or the central system can call the mobile phone based on identifying information entered by the merchant, which might merely be the mobile phone number. Identification and integrity are provided by the use of a smart chip 1. As discussed below, if the central system places the call, identification and integrity can be assured without the use of a smart chip, provided the system calls a number previously established for the user with integrity rather than a number supplied by the user to the merchant at the time of sale.

As mentioned above, merchants can broadcast their offerings to all who come into proximity, such as people approaching a theater entrance, requiring each person to merely press a button to indicate acceptance or to have already authorized a charge from that merchant whenever they pass the entrance. Transmission of such offerings is preferably by short distance radio such as Bluetooth or 802.11. Alternatively, the mobile phone (or a nearby antenna with which it is in communication) can regularly broadcast its location and ID to a wide area network which sends the ID to selected merchants in the area who then direct their offerings to the ID of each nearby mobile phone. Each mobile phone can determine its location by GPS or by analysis of signals to or from local cellular antennas.

Use of Wireless Authorization Device for Global Network Transactions

Unlike credit cards, debit cards, and proximity identity cards, with this invention, by using a smart chip 1 and requiring entry 9 of a knowledge token, the mobile phone with smart chip can be used for electronic commerce on the global computer network (Internet) with low security risk. For e-commerce transactions from a user's personal computer (PC), the user's computer preferably has a Bluetooth or 802.11 or similar access point for direct communications with the mobile phone. Alternatively, the communications can pass indirectly from the personal computer, through the global computer network to the mobile phone.

Information about the proposed transaction is presented on the PC screen and either on the mobile phone screen 6, or on the phone speaker by voice announcement, or on both. To approve the transaction, the user enters 9 a knowledge token or, having previously entered the knowledge token, presses a key in the mobile phone, and an account designated by the user is charged. Identity is proved by possession of the mobile phone and knowledge of the token. Intent to agree to the transaction is proved by entry of the token or a subsequent key press. Integrity is provided by encrypted communications from the smart chip to the central system. Assurance is provided by the bank checking the user's account before approving the transaction.

Similar transactions can be conducted with only the mobile phone and no PC. Information from a merchant is presented only on the phone, by screen display or voice announcement or both.

E-Commerce Methods with Existing Phones and PCs

As mentioned above, identification and integrity can be assured without the use of a smart chip, provided the system calls on a telephone circuit a number previously established for the user rather than a number supplied by the user to the merchant at the time of sale. In most in-person situations, merchants and users will prefer to simply use existing credit card and debit card systems with merchant POS terminals. However, for e-commerce from a user's computer, there is no POS terminal and a variation of the invented methods solves problems for such e-commerce with existing installed hardware.

For e-commerce transactions from personal computers, the preferred hardware embodiments described above require a smart chip in each mobile phone and a short distance radio circuit in each mobile phone and in each PC. By using a variation in the methods, existing installed telephones, both wired and wireless, and existing installed PCs, none of which have short distance radio circuits or smart chips, can be used for e-commerce from PC's. This variation in the invented method relies on the facts that a call in the public switched telephone network (PSTN) will be directed only to a specific authorized device or location (in contrast to internet communications which can be spoofed), and a reply with a proper PIN number given in response to such a call must come from an authorized person. In other words, if a call is placed to an authorized telephone number, the call is answered, and a verbal or DTMF or digital data reply is given containing information that only an authorized person would know, such as a PIN, we can presume that the reply was authorized, with very low risk of false identification, intent, or integrity.

Figure 2:
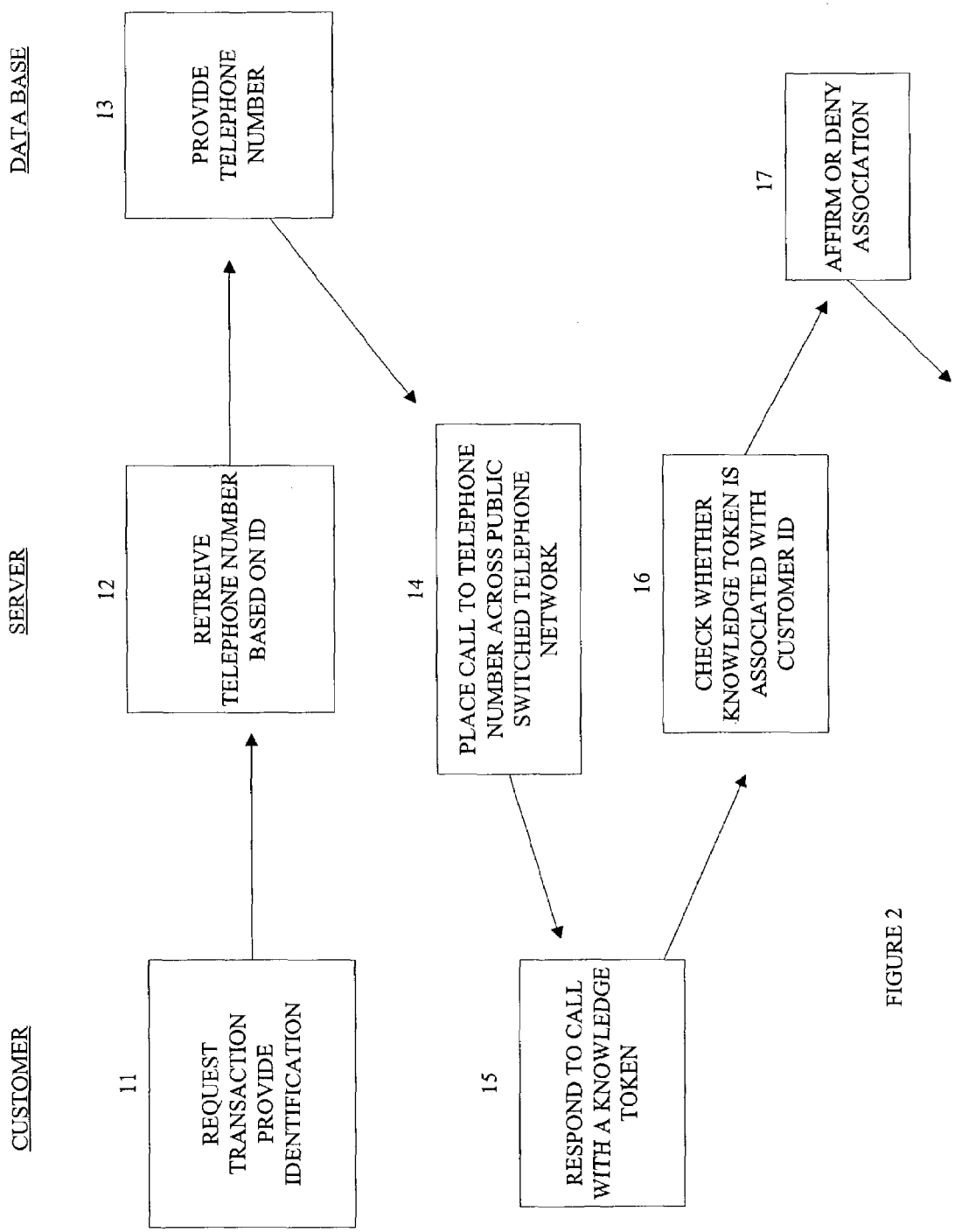
FIG. 2 shows a method that can be used with existing infrastructure and then subsequently migrated to using the preferred authorization devices.

In this method, as shown in FIG. 2, each customer establishes a credit or debit account with a "bank" and specifies a telephone number, either wired or wireless, convenient to the user, to be used for authorizations. The "bank" can be any trusted party, including a merchant. Then, when a proposed transaction has been defined and customer identification provided, step 11, with a PC or by any other remote means such as telephone, the bank's system retrieves the telephone number, step 12, which is provided by a database, step 13, and places a call to the designated telephone number, step 14. When the user answers the call, information identifying the proposed transaction, such as a verbal description or a number that was displayed on the PC, is presented by voice or by screen display on the telephone. The user then keys or voices a knowledge token, step 15, or presses a key having previously entered the knowledge token, indicating intent to agree to the transaction. The system checks the knowledge token against information in a database, step 16, which affirms or denies validity, step 17. The agreed charge is then made to the account previously designated. After checking the user's account, an assurance is sent by the bank to the merchant that the funds will be paid.

The bank account number and information identifying the account owner are never sent over the telephone circuit. Only the knowledge token and perhaps signals indicating the user's agreement to a particular term are sent over the circuit. Consequently, it is difficult for a person that obtains the knowledge token to also obtain the account number or the name of the account owner.

Because the PIN or other knowledge token is transmitted only over telephone lines which are circuit connections rather than data packets on a bus, it is very difficult for a thief to intercept the knowledge token, in contrast to internet communications which can be easily intercepted at many locations. Being a circuit connection, a thief must physically tap the signals, which is only easy for people in the same building as the telephone with access to the wires (or in the same area for a wireless phone) or working in a telephone company switching center. Even if a thief learns the knowledge token, it can only be used by adding to the phone system a telephone that rings when a call is placed to the authorized number and can be answered before the authorized phone is answered. This is only achievable by telephone company employees and people in the same building as an authorized wired telephone with access to the telephone wires. Because people with such access are generally few and identifiable, the chances of catching such a thief are high. Because the signals are analog sound signals rather than digital data signals, it is very difficult to modify the signals on the fly and pass on a substituted knowledge token. Consequently, the risk of improper identification of the buyer is very low.

To avoid a customer's account from being high jacked, security measures must be used to prevent a thief from simulating the customer and instructing that the authorized telephone number or knowledge token be changed. Well known procedures used by financial institutions to control changes of addresses and PINs meet this need.

Because telephone companies identify the person responsible for charges to each telephone number and send regular bills, they are in a good position to act as the "bank" for this alternative method using existing telephone and PC hardware for e-commerce, whether by credit or debit methods. However, telephone companies need not be involved. A traditional bank can fill the role, programming their computer to make a call to whatever number has been properly previously designated by their customer for automated prior verification with a PIN of any proposed charges reported to the bank via the internet. All that is required of internet merchants is that their computer systems report to the bank sufficient details about the proposed transaction so that the bank's automated system can describe the transaction with synthesized voice adequately for the customer's satisfaction. As internet merchants already report such information for credit card charges, nothing need be changed at the merchant computer systems provided they are already set up to accept credit cards. Any bank can simply change its systems to start calling its customers for PIN verifications of each charge. This change can be implemented customer by customer. Because this method uses PIN verification with high integrity, debit methods can be employed without any change to the merchant systems. The PIN is never transmitted on the internet and the merchant never learns the PIN. Also nothing needs to be changed or added in the customer's computer.

This alternative method using existing PCs and telephones for e-commerce transactions provides a simple upgrade path to the preferred embodiments first described above which then allow the mobile phone to be used as a universal key and authorization device. Each customer can be migrated one at a time as they acquire the necessary hardware for other reasons.

Upgrade Migration Path

As described above and as shown in FIG. 1, essential features of the preferred authorization device comprise a smart chip 1, means for entry of input 2, a radio communications link 3, and a power supply 4, all housed in a package 5 that is convenient for the person to carry in a secure fashion at all times when proof of authorization might be needed, preferably a mobile telephone with a screen display 6. However, until hack-proof smart chips and short distance radio communication circuits are installed in most mobile phones, the preferred methods will not be widely adopted. What is needed is a migration path that allows use of the methods to be commenced with existing hardware and then upgraded in a way that maintains user acceptance throughout.

The core of the user experience with the preferred embodiment is use of a telephone identified with the user to enter an approval or confirmation of a transaction. The telephone communication can be initiated by the user or a merchant or a bank.

There are presently internet commerce transactions that are not undertaken or are charged with an extra fee because repudiation of credit card charges is frequent. Adequate security can be provided for these transactions with an invented method by having the user register a telephone number with the merchant or a "bank" which might be, for examples, a branch of the merchant, or an independent service organization (ISO), or a commercial bank, or a telephone company. The "bank" must have a way of assuring the identity of the person establishing an association with the telephone number as a person of worthy credit or with a positive balance in a bank account. The initial identity can be established at the initial use of the system by a customer service representative at the "bank" calling the designated telephone number and asking a question, such as the mother's maiden name, that identifies the person to the bank's satisfaction. A knowledge token is then given by the person over the telephone, not over the internet, to the bank where it is recorded as a sound file or as DTMF data or on paper or entered in a computer memory. Then, whenever the user seeks a subsequent internet transaction, the bank's computer system automatically calls the user and, if the knowledge token is received in response, approves the transaction after checking the user's account.

In any internet commerce market where there are identified customers with good credit or willingness to pay in advance and existing internet payment systems are inadequate, the method just described can be implemented for a few merchants or their banks or independent service organizations (ISOs) without requiring adoption by a large critical mass. It can then be expanded customer by customer, merchant by merchant, and ISO by ISO. It is indifferent to whether the customers have wired telephones or wireless telephones. When a large enough number of users have smart chips in their mobile telephones, the security for a portion of the customers can be changed to using the smart chip for authentication without a significant change in the user experience. When a large enough number of users have local radio communications circuits in their mobile telephones and their PCs, the communications with the mobile telephone for a portion of the customers can be changed to using local radio to the PC without a significant change in the user experience. Once mobile telephones with smart chips and local radio abilities become ubiquitous, the mobile telephones can become universal authentication devices for all applications as merchants and other proprietors add local radio communications circuits to their access control locations.

While particular embodiments of the invention have been disclosed, the scope of the invention is not to be limited by the above embodiments but only by the following claims:

I claim:

1. A mobile telephone having electronic authentication circuitry for authentication for a transaction, comprising:
    (a) a hack-proof, non-duplicatable, authenticating smart chip with a bi-directional communications port;
    (b) a radio communications circuit coupled to the communications port;
    (c) an input circuit that receives user input and provides it to the smart chip;
    (d) a wireless power supply that powers the aforementioned elements; and
    (e) a programmed logic circuit which causes the authenticating smart chip to require receipt of a knowledge token from the input circuit to achieve authentication and, upon receipt of said token, then securely report achievement of authentication via the radio communications circuit to another system to which the smart chip securely authenticates itself with bi-directional crypto communications as part of a transaction with the system;
    (f) all housed in a portable housing of a mobile telephone.

2. The mobile telephone of claim 1 where the radio communications circuit operates on one of the standards of Bluetooth or 802.11.

3. The mobile telephone of claim 1 further comprising a display screen coupled to the smart chip.

4. The mobile telephone of claim 1 where the radio communications circuit operates via conventional mobile telephone communications.

5. A method of authenticating for a transaction a user of a mobile telephone having authentication circuitry including a hack-proof, non-duplicatable, authenticating smart chip, a user input receiver, and a radio communications circuit, comprising:
    (a) transmitting between a radio communications access point and the mobile telephone information identifying a proposed transaction;
    (b) receiving at said access point via radio communications from the hack-proof, non-duplicatable, authenticating smart chip within the mobile telephone encrypted information identifying the telephone which information is crypto-verified with bi-directional radio communications between the access point and the hack-proof, non-duplicatable, authenticating smart chip within the telephone;
    (c) comparing said identifying information received at said access point to records in a database and determining whether there is a record indicating that said telephone is authorized and was last registered to a person with a valid account; and
    (d) receiving at said access point via encrypted bi-directional radio communications from the mobile telephone information indicating that the telephone is a type that requires receipt of an intentionally given knowledge token at a user input receiver on said telephone, as well as information indicating that an appropriate knowledge token has been received and verified using said hack-proof, non-duplicatable, authenticating smart chip relative to said information identifying a proposed transaction.

6. The method of claim 5 where the information identifying a proposed transaction is first sent by the mobile telephone to the access point.

7. The method of claim 5 where the information identifying a proposed transaction is first sent by the access point to the mobile telephone.

8. The method of claim 5 where said account is a permitted access account and the proposed transaction is the unlocking of a door.

9. The method of claim 5 where said account is a credit account and the proposed transaction is charging said account.

10. The method of claim 5 where said account is a debit account and the proposed transaction is charging said account.

11. The method of claim 5 where the radio communications is via one of a standard called Bluetooth or a standard called 802.11.

12. The method of claim 5 where the access point it at a merchant's point of sale location.

13. The method of claim 5 where the access point it at an entrance to a facility for use by humans.

14. The method of claim 5 where the access point is coupled to a personal computer which is coupled to a computer network and the database is in a server coupled to the personal computer via the network.

15. The method of claim 14 where the server is operated by a financial institution.

16. The method of claim 5 where the access point is coupled to a personal computer which stores and operates the database.

17. The method of claim 5 where the radio communications is via conventional mobile telephone communications.

18. A system for authenticating for a transaction a user of a mobile telephone having authentication circuitry including a non-duplicatable smart chip, a user input receiver, and a radio communications circuit, the system comprising:
 (a) a radio communications access point with a transmitter-receiver capable of communicating between the radio communications access point and a mobile telephone information identifying a proposed transaction;
 (b) a crypto-verification component that receives via the access point radio communications from a hack-proof, non-duplicatable, authenticating smart chip within the mobile telephone with encrypted information identifying the telephone and crypto-verifies the information with bi-directional radio communications between the access point and the hack-proof, non-duplicatable, authenticating smart chip within the telephone;
 (c) a database comparison component that compares said identifying information received at said access point to records in a database and determines whether there is a record indicating that said telephone is authorized and was last registered to a person with a valid account; and
 (d) a knowledge token verification component that receives via said access point via encrypted bi-directional radio communications from the hack-proof, non-duplicatable, authenticating smart chip within the mobile telephone, relative to said information identifying a proposed transaction, information indicating that the telephone is a type that requires receipt of an intentionally given knowledge token at a user input receiver on said telephone, as well as information indicating that an appropriate knowledge token has been received and verified using the hack-proof, non-duplicatable, authenticating smart chip.

19. The system of claim 18 where the information identifying a proposed transaction is first sent by the mobile telephone to the access point.

20. The system of claim 18 where the information identifying a proposed transaction is first sent by the access point to the mobile telephone.

21. The system of claim 18 where said account is a permitted access account and the proposed transaction is the unlocking of a door.

22. The system of claim 18 where said account is a credit account and the proposed transaction is charging said account.

23. The system of claim 18 where said account is a debit account and the proposed transaction is charging said account.

24. The system of claim 18 where the access point it at a merchant's point of sale location.

25. The system of claim 18 where the access point it at an entrance to a facility for use by humans.

26. The system of claim 18 where the access point is coupled to a personal computer which is coupled to a computer network and the database is in a server coupled to the personal computer via the network.

27. The system of claim 26 where the server is operated by a financial institution.

28. The system of claim 18 where the access point is coupled to a personal computer which stores and operates the database.

29. The system of claim 18 where the radio communications is via conventional mobile telephone communications.

30. The system of claim 18 where the radio communications is via one of a standard called Bluetooth or a standard called 802.11.

* * * * *